United States Patent [19]

Ebi et al.

[11] 4,322,734
[45] Mar. 30, 1982

[54] VARIABLE SPEED ELECTROSTATOGRAPHIC APPARATUS

[75] Inventors: Yutaka Ebi; Tamio Ohori; Fuyuhiko Matsumoto; Satoru Tomita, all of Tokyo, Japan

[73] Assignee: Ricoh Company, Ltd., Tokyo, Japan

[21] Appl. No.: 92,396

[22] Filed: Nov. 8, 1979

Related U.S. Application Data

[63] Continuation-in-part of Ser. No. 881,702, Feb. 27, 1978.

[30] Foreign Application Priority Data

Feb. 2, 1977 [JP] Japan .................................. 52-21284

[51] Int. Cl.³ .................... G01D 15/06; G03G 15/02
[52] U.S. Cl. ................................. 346/153.1; 346/160
[58] Field of Search ............................ 346/153–155, 346/160; 358/300

[56] References Cited

U.S. PATENT DOCUMENTS

| | | | |
|---|---|---|---|
| 3,634,867 | 1/1972 | McConnell | 346/160 |
| 3,659,936 | 5/1972 | Klose | 346/160 |
| 3,702,482 | 11/1972 | Dolcimascolo | 346/160 |
| 3,747,119 | 7/1973 | Matkan | 346/160 |
| 3,818,492 | 6/1974 | Matkan | 358/300 |
| 3,869,569 | 3/1975 | Mason | 346/160 |
| 4,005,439 | 1/1977 | Levy | 346/160 |

*Primary Examiner*—John H. Wolff
*Attorney, Agent, or Firm*—David G. Alexander

[57] ABSTRACT

In an electrostatographic apparatus (11) such as a facsimile receiver, an electrical discharge electrode assembly (14) progressively forms an electrostatic image on an endless belt (12) as the belt (12) moves relative thereto. The belt (12) comprises a transparent substrate layer (12a) on which is formed a photoconductive layer (12b) and a dielectric layer (12c), with the electrostatic image being formed on the dielectric layer (12c). A lamp (26) illuminates the photoconductive layer (12b) to vary the conductivity thereof with an intensity according to the speed of movement of the belt (12).

16 Claims, 4 Drawing Figures

VARIABLE SPEED ELECTROSTATOGRAPHIC APPARATUS

CROSS REFERENCE TO RELATED APPLICATION

This application is a continuation in part of copending U.S. Patent application Ser. No. 881,702, filed Feb. 27, 1978.

BACKGROUND OF THE INVENTION

The present invention relates to an electrostatographic apparatus such as a facsimile receiver.

An apparatus of this type comprises a transfer medium such as a plastic dielectric sheet about 100 microns thick with a thin layer of a conductive material formed on a back surface thereof. In response to, for example, electrical signals from a facsimile transmitter, a discharge electrode assembly comprising a plurality of discharge electrodes is energized to form an electrostatic image on the sheet through electrical discharge. The sheet is moved adjacent to the electrode assembly. The electrodes, which are arranged in a row, are individually energized in accordance with the input signals to progressively form the electrostatic image on the sheet. The sheet is reusable and is advantageously provided in the form of a rotating endless belt.

A developing unit comprising, for example, a magnetic brush applies a toner substance to the belt to develop the electrostatic image into a toner image. A transfer unit transfers the toner image to a copy sheet to which the toner image is fixed to provide a hard facsimile copy or reproduction.

In facsimile transmission, it is desirable to selectively transmit at a plurality of different speeds or data rates. The operations of forming the electrostatic image and transferring the same to a copy sheet must be carried out at corresponding speeds. For example, a high transmission rate provides low transmission time but low resolution, and vice-versa. Different original documents for facsimile transmission have different resolution requirements, as is well known in the art.

With all other factors being equal, increasing the speed of the belt to accommodate a higher transmission rate results in a reduction in the density of the copy. In the prior art, the voltage applied to the discharge electrodes is increased to restore the copy density to the desired level. However, there is a practical limit to how much the voltage may be increased, taking into effect safety of operation and damage to the electrodes. The voltage range required in the prior art is generally greater than can be accommodated in actual practice, and a choice must be made as to whether insufficient copy density is more objectionable than short electrode life at high transmission rates.

SUMMARY OF THE INVENTION

The present invention overcomes the drawbacks of the prior art by replacing the prior art dielectric belt with an improved belt having a dielectric layer and a photoconductive layer. The photoconductive layer is illuminated with an intensity corresponding to the speed of movement of the belt to adjustably vary the conductivity thereof to suitably adjust the copy density without resort to high electrode voltages.

It is an object of the present invention to provide an electrostatographic apparatus embodying an improved method of adjustably varying copy density to a desired level at different speeds of movement of a transfer member.

It is another object of the present invention to provide an electrostatographic apparatus comprising a discharge electrode assembly in which the service life of the electrode assembly is increased over the prior art.

It is another object of the present invention to provide an electrostatographic apparatus which produces copies of optimal density at all speeds of operation.

It is another object of the present invention to provide a generally improved electrostatographic apparatus.

Other objects, together with the foregoing, are attained in the embodiments described in the following description and illustrated in the accompanying drawing.

DESCRIPTION OF THE PREFERRED EMBODIMENTS

Figure 1:
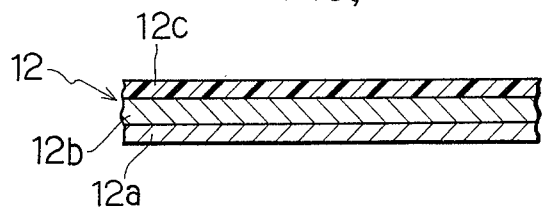
FIG. 1 is a cross sectional view of an endless transfer belt of the present invention.

While the electrostatographic apparatus of the invention is susceptible of numerous physical embodiments, depending upon the environment and requirements of use, substantial numbers of the herein shown and described embodiments have been made, tested and used, and all have performed in an eminently satisfactory manner.

Referring now to the drawing, an electrostatographic apparatus embodying the present invention is generally designated by the reference numeral 11 and comprises an endless belt 12 which is trained around four rollers which are all designated as 13. One of the rollers 13 rotatable driven clockwise so that the belt 12 and the other rollers 13 are also rotated clockwise. The belt 12 comprises an electrically conductive, transparent substrate layer 12a which engages the rollers 13. The rollers 13 may also be made of a conductive material such as metal and may be electrically grounded.

Formed on the substrate layer 12a is a photoconductive layer 12b. Yet another layer is formed on the photoconductive layer 12b, this layer being formed of a dielectric material and designated as 12c.

A discharge electrode assembly 14 is provided adjacent to the belt 12 and comprises a base electrode 14b and a plurality of needle electrodes 14a. The needle electrodes 14a are provided in a row which extends perpendicular to the plane of the drawing, so that only one electrode 14a is visible. The electrodes 14a are electrically insulated from each other. The electrode 14b also extends perpendicular to the plane of the drawing, and is coextensive with the electrodes 14a. The electrodes 14a are individually energized in response to input signals from a facsimile transmitter or the like (not shown) in accordance with an image pattern to form an electrical discharge to the electrode 14b. This causes an electrostatic image to be progressively formed on the dielectric layer 12c of the belt 12 as the same passes adjacent to the electrode assembly 14.

A developing unit 16 comprising a magnetic brush 16a applies a toner substance to the belt 12 to develop the electrostatic image into a toner image. The toner adheres to the areas of high electrostatic charge on the belt 12. A copy sheet 17 is moved by rollers 18 into engagement with the belt 12 at the same surface speed thereof. A transfer charging unit 19 applies an electrostatic charge of the same polarity as the electrostatic image to the back of the copy sheet 17, causing the toner image to be transferred from the belt 12 to the copy sheet 17. Although not shown, a fixing unit fixes the toner image to the copy sheet 17 through heat and/or pressure to provide a hard and permanent copy. After the transfer operation, a discharging unit 21 discharges the belt 12 and a cleaning unit 22 comprising a magnetic brush 22a removes any residual toner substance from the belt 12.

Figure 3:
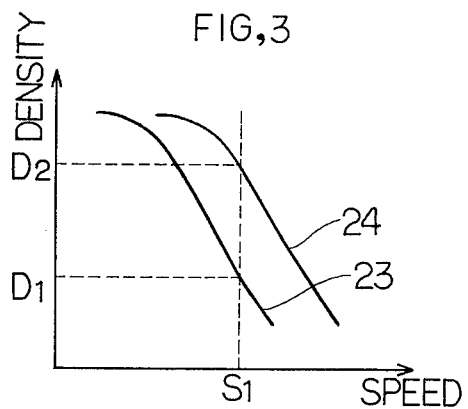
FIG. 3 is a graph illustrating the operation of the present invention.

In accordance with the present invention, the belt 12 is movable at several different speeds to accommodate respective facsimile transmission rates. A curve 23 in FIG. 3 illustrates how the toner image density decreases as the belt speed is increased if no provision is made to compensate. Naturally, it is desirable for the toner image density to be an optimum value regardless of the operating speed, and to remain constant even if the speed is changed.

In accordance with the present invention, a light source 26 is provided to illuminate the photoconductive layer 12b of the belt 12 through the transparent substrate layer 12a. The light source 26 may be positioned either upstream of the electrode assembly 14 or at the same position thereas in the direction of movement of the belt 12.

The intensity of the light source 26 is varied in accordance with the speed of movement of the belt 12 in such a manner that the toner image density is constant at all speeds. The conductivity of the layer 12b has a major effect on the efficiency of the developing process and thereby the toner image density which constitutes the density of the finished copy. The greater the intensity of the light source 26, the greater the conductivity of the photoconductive layer 12b and the greater the copy density. A curve 24 in FIG. 3 illustrates the effect of increasing the intensity of the light source 26 above an intensity used in producing the curve 23. It will be seen that at a given speed S1, a copy density D2 of the curve 24 is greater than a copy density D1 of the curve 23.

An increase in the speed of movement of the belt 12 causes a reduction in the density of the copy. Thus, the intensity of radiation of the light source 26 should be increased as the speed of movement increases to increase the copy density to the desired value. The conductivity of the layer 12b depends on the intensity of illumination thereof, and can vary from a small value to a large value in accordance with said intensity. When the belt 12 is moved at maximum speed, the intensity of the light source 26 is made high so that the conductivity of the layer 12b is maximum. Thus, there is high conduction in the layer 12b. The intensity of the light source 26 and conductivity of the layer 12b are progressively increased as the belt speed increases to maintain the copy density constant.

A novel feature of the present invention resides in the combination of the belt which has a dielectric layer 12c formed on a photoconductive layer 12b and the light source 26 which radiates the dielectric layer with progressively greater intensity as the speed of movement of the belt 12 increases.

Although the technical factors which contribute to the phenomenon of the present invention are complicated and interactive, the basic principle of the invention may be understood by considering the most dominant factor.

The potential V across the layers 12b and 12c varies as a function of the amount of charge Q induced on the upper surface of the layer 12c as follows $$V = \frac{Q}{C} \tag{1}$$

where C is the capacitance across the layers 12b and 12c. The higher the potential V, the higher the density of the copy. An increase in the speed of movement of the belt 12 causes a reduction in the charge Q induced on the dielectric layer 12c and thereby the density.

This effect is overcome in accordance with the present invention by progressively decreasing the capacitance C as the speed of the belt 12 increases. The capacitance C can be expressed as follows $$C = \frac{KAD}{t} \tag{2}$$

where K is a proportionality constant, A is the surface area of the layer 12c, D is the dielectric constant of the layers 12b and 12c taken in combination and t is the thickness of the layers 12b and 12c.

Radiation of the layer 12b with light causes photoconduction therein and a reduction of the overall dielectric constant D. This in turn reduces the capacitance C and increases the potential V and copy density.

It is noteworthy that at any particular belt speed the amount of charge Q is constant and that light radiation of the layer 12b does not cause dissipation of charge. Light radiation causes migration of induced charge through the layer 12b toward the interface of the layers 12b and 12c.

Where a switch or knob 41 is provided to vary the speed of rotation of the belt 12, a control means 42 for varying the intensity of the light source 26 may be controlled in an interlocked manner. The intensity may be varied in any known manner by means of a variable series resistance, variable voltage source, thyrister, etc.

As an alternative, a sensor may detect the speed of movement of the belt 12 and suitably vary the light intensity in accordance therewith. The light intensity as a function of speed is also influenced in a predetermined manner by the material of the dielectric and photoconductive layers 12c and 12b respectively, the electrode voltage, the distance between the electrode assembly 14 and the belt 12, and similar factors.

Although the present invention is shown and described as varying the conductivity of the layer 12b by means of light radiation, the invention is not so limited. The present principle may be applied to vary the conductivity of a suitable intermediate layer by means of heat or pressure. In this case, the intermediate layer may comprise any material as exemplified by cadmium sulfide dispersed in high polymer resin or carbon black dispersed in resilient rubber, respectively. It will also be understood that the copy sheet 17 may be made of paper, synthetic paper or plastic, and that the belt 12 may be replaced with a drum (not shown) having a variable conductivity layer and a dielectric layer formed thereon. The apparatus 11 may further be operated in such a manner that a single electrostatic image, once formed, may be developed a number of times and the resulting toner images transferred to copy sheets.

Figure 2:
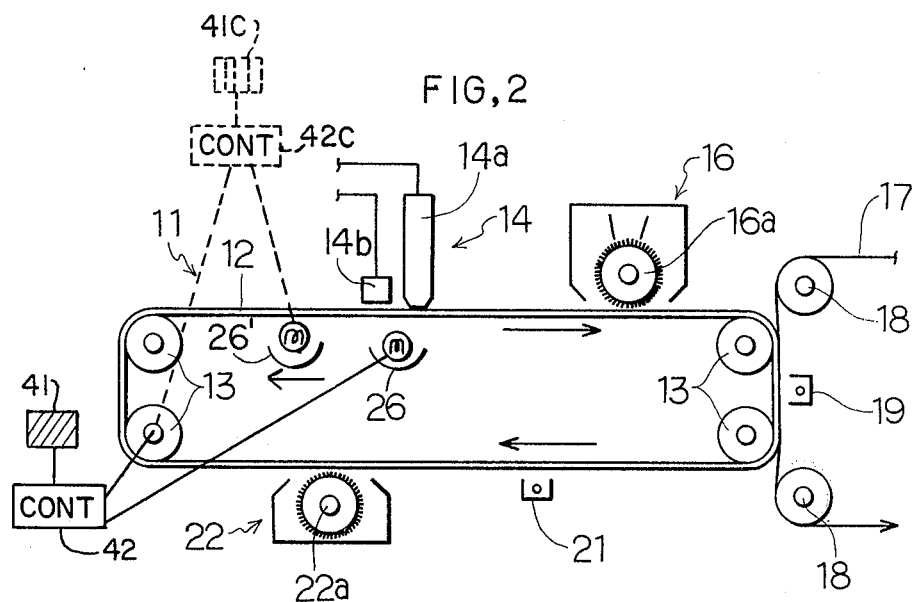
FIG. 2 is a schematic side elevation of an electrostatographic apparatus embodying the present invention.
Figure 4:
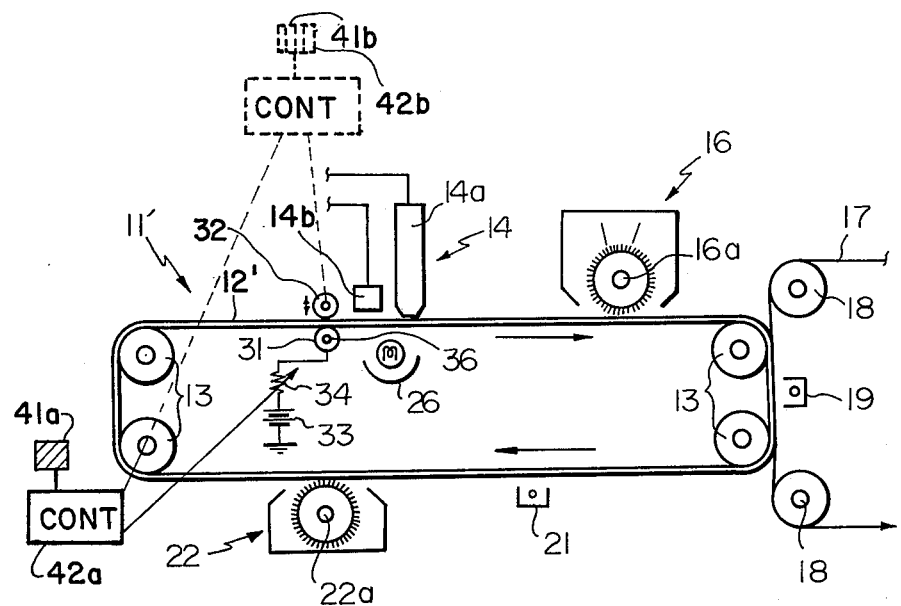
FIG. 4 is similar to FIG. 2 but shows another embodiment of the present invention.

FIG. 4 shows another embodiment of the present invention which is designated as 11'. Like elements are designated by the same reference numerals used in FIG. 2.

The apparatus 11' comprises a modified belt 12' having a variable conductivity layer formed of, for example, cadmium sulfide dispersed in high polymer resin, the conductivity of which increases in response to an increase in heat or pressure.

The light source 26 is replaced by a pair of rollers 31 and 32. A power source 33 applies electrical current through a variable resistor 34 to an electrical resistance heater 36 disposed in the roller 31.

The resistor 34 is variable by means of a knob 41a and control unit 42a to allow variation of the current applied to the heater 36 as a function of the speed of movement of the belt 12'. The resistance of the resistor 34 is decreased as the belt speed increases to increase the current to the heater 36, the heat produced thereby and the conductivity of the belt 12'. As an alternative or in combination, the roller 32 may be made movable by a knob 41b and control unit 42b perpendicular to the belt 12' to increase the nipping pressure applied to the belt 12' by the rollers 31 and 32 as the belt speed increases. This has the same effect of increasing the conductivity of the belt 12' as the speed thereof increases. In accordance with the present invention, the power source 33, resistor 34 and heater 36 may be omitted where the roller 32 or alternatively the roller 31 is made movable to increase the nipping pressure as the belt speed increases. It is also possible to omit the roller 32 where the heater 36 is used to vary the heat applied to the belt 12'. The heater 36 may be used directly without being combined with the roller 31. The belt 12' may be replaced with another material which has the property of increasing in conductivity as applied heat and/or pressure decreases.

Another modification of the present invention is to provide a photoconductive layer 12b having a property such that the conductivity thereof increases exponentially after de-energization of the light source 26. In this case, a source 26' may be positioned by a knob 41c and control unit 42c closely adjacent to the electrode assembly 14 at maximum belt speed and moved upstream thereof for lower speeds.

The photoconductive layer 12b may be selected from the following inorganic materials: Se, ZnO, CdS, ZnS, CdSe, CdSSe, ZnCdS and SeTe, polyvinyl carbozol resins, polyvinyl anthracene resins, polyvinyl glutamic acid ester resins, anthracene, anthraquinone, phenylenediamines, quinacridone, phthalocyanines, triphenylamines, 1,2,4-triazine, carbazole, oxadiazole, triphenylmethane, diphenylmethance, 5-aminothiazole, pyrazoline, imidazole, imidarizine, polyphenylene tiazole, benzotiazole and benzimidazole. Also usable are various organic high polymers and pigments disclosed in numerous documents including U.S. Pat. Nos. 3,314,788, 3,615,404, 3,189,447, 3,174,854, 3,139,338, 3,066,023, 3,615,399, 3,615,406, 3,615,414, 3,498,784 and 3,512,966. These photoconductive substances are employed either singularly or in combination with a bonding agent. The bonding agent may comprise any substance known in the field of photosensitive elements for electrophotography as exemplified by cellulose group, acryl resins, styren resins, amide resins, silicon resins and various ester resins. Other permissible additives are a plasticizer for providing plasticity to the layer 12b and a reforming agent generally provided in the art of electrophotography in a photosensitive layer.

Dielectric materials available for the dielectric layer 12c are organic resins including acrylic resin, methacrylic resin, styrene resin, styrene-butadien resin, silicone resin, epoxy resin, polyvinyl acetate, polyvinyl butyral, polyvinyl chloride, vinyl acetatevinyl chloride copolymer, polyvinylidene chloride, vinyl chloride-vinylidence chloride copolymer, polyester, poly-p-xylyrene, polycarbonate and polyurethane or inorganic substances such as glass.

A ferroelectric substance disclosed in U.S. Pat. No. 3,793,642 may be dispersed in any of the above compositions.

The conductive layer 12a may comprise a sheet of glass or plastic on which is formed a coating of a conductive material or a vacuum evaporated layer of a metal or metal compound, for example aluminum, copper oxide or tin oxide. Alternatively, the conductive material may be dispersed in the sheet. Other usable conductive agents are carbon black and high polymer conductive substances.

It is possible to omit the conductive layer 12a where the photoconductive layer 12b has sufficient mechanical strength. Such materials are disclosed in Japanese Patent publications 43-2179 and 43-21793.

Bonding agents may be provided to adhere adjacent layers together. Suitable bonding agents are phenol resin, urea resin, melamine resin, polyester resin, polyurethane resin and silicon resin.

EXAMPLE

The conductive substrate 12a was formed by vacuum deposition of a transparent metal layer on a polyester film. The metal material was manufactured by the Toray Textiles, Inc. under the trade name HIGH-BEAM. The photoconductive layer 12b was formed on the substrate layer 12a to a thickness of 25 microns and, being constituted by an organic semiconductor, had the following composition.

| polyvinylcarbazole | 2 parts |
|---|---|
| trinitrofuruorenone | 3 parts |
| polyester resin binder | 0.5 parts |

The dielectric layer 12c was formed on the photoconductive layer 12b to a thickness of 5 microns and comprised polyester resin.

The belt 12 manufactured as described above was tested in the apparatus 11. The electrode assembly 14 comprised a stylus type discharging unit and the light source 26 comprised a halogen lamp. The light source 26 was disposed at the same position as the electrode assembly 14 in the direction of movement of the belt 12. The light intensity was varied in accordance with the belt speed and produced substantially constant toner image density at all speeds. The curves 23 and 24 were produced by the apparatus 11 of the example.

In summary, it will be seen that the present invention provides an electrostatographic apparatus which can operate at various speeds and produce copies of optimum density regardless of operating speed. Dangerously high electrode voltages are avoided and electrode life is prolonged over the prior art.

Various modifications will become possible for those skilled in the art after receiving the teachings of the present disclosure. For example, the dielectric layer 12c may be transparent and the light source 26 be adapted to illuminate the photoconductive layer through the dielectric layer 12c rather than through the substrate layer 12a.

What is claimed is:

1. An electrostatographic apparatus comprising:
   a moving member having a variable conductivity layer and a dielectric layer;
   first means for forming an electrostatic image on the dielectric layer as the moving member moves adjacent to the first means;
   the first means comprising a plurality of electrodes and means for individually energizing the electrodes to produce electrical discharge from the electrodes; and
   second means for varying the conductivity of the variable conductivity layer in accordance with a speed of movement of the moving member;
   the variable conductivity layer being photoconductive, the second means comprising a variable intensity light source for illuminating the variable conductivity layer.

2. An apparatus as in claim 1, in which the second means is disposed upstream of the first means in a direction of movement of the moving member.

3. An apparatus as in claim 1, in which the first and second means are disposed at a same position in a direction of movement of the moving member.

4. An apparatus as in claim 1, in which the first and second means are disposed in such a manner that the moving member moves therebetween.

5. An apparatus as in claim 1, in which the moving member comprises an endless belt.

6. An apparatus as in claim 1, in which the moving member further comprises a conductive substrate layer, the variable conductivity layer being disposed between the substrate layer and the dielectric layer.

7. An apparatus as in claim 6, in which the substrate layer is transparent, the light source illuminating the variable conductivity layer through the substrate layer.

8. An electrostatographic apparatus comprising:
   a moving member having a variable conductivity layer and a dielectric layer, the variable conductivity layer being rendered conductive in accordance with an intensity of incident light radiation, the conductivity of the variable conductivity layer decreasing as a function of time after termination of light radiation;
   first means for forming an electrostatic image on the dielectric layer as the moving member moves adjacent to the first means;
   the first means comprising a plurality of electrodes and means for individually energizing the electrodes to produce electrical discharge from the electrodes; and
   second means for varying the conductivity of the variable conductivity layer in accordance with a speed of movement of the moving member;
   the second means comprising a fixed intensity light source for uniformly illuminating the variable conductivity layer and means for positioning the light source upstream of the first means in a direction of movement of the moving member at a distance from the first means corresponding to the speed of movement of the moving member.

9. An apparatus as in claim 8, in which the means for positioning the light source is constructed to increase said distance as the speed of movement of the moving member decreases.

10. An apparatus as in claim 8, in which the moving member further comprises a conductive substrate layer, the variable conductivity layer being disposed between the substrate layer and the dielectric layer, the substrate layer being transparent, the light source illuminating the variable conductivity layer through the substrate layer.

11. An electrostatographic apparatus comprising:
    a moving member having a variable conductivity layer and a dielectric layer;
    first means for forming an electrostatic image on the dielectric layer as the moving member moves adjacent to the first means; and
    second means for varying the conductivity of the variable conductivity layer in accordance with a speed of movement of the moving member.

12. An apparatus as in claim 11, in which the conductivity of the variable conductivity layer varies in accordance with temperature, the second means comprising variable temperature heater means.

13. An apparatus as in claim 12, in which the variable temperature heater means comprises an electrical heater, a power source and a variable resistor connected between the power source and the heater.

14. An apparatus as in claim 12, further comprising a roller which contacts the moving member, the heater means being disposed in the roller.

15. An apparatus as in claim 11, in which the conductivity of the variable conductivity layer varies in accordance with pressure, the second means comprising first and second rollers for nipping the moving member therebetween with variable pressure.

16. An apparatus as in claim 11, 12, 13, 14 or 15, in which the second means is constructed to increase the conductivity of the variable conductivity layer as the speed of movement of the moving member increases.

* * * * *